[Patent 3,085,879 — April 16, 1963]

3,085,879
NOVEL COCOA PRODUCTS

Daniel V. Wadsworth, New York, Santino Paul Marino, Tarrytown, and Chun F. Ho, Yonkers, N.Y., assignors to Corn Products Company, New York, N.Y., a corporation of Delaware
No Drawing. Filed Mar. 11, 1960, Ser. No. 14,189
14 Claims. (Cl. 99—26)

This invention relates to novel cocoa products and to a novel process for producing them. More particularly, the invention relates to crystalline cocoa products comprising a complex of crystalline particles of sucrose which optionally, but desirably, contain minor amounts of mono- and other di-saccharides, preferably invert or dextrose, coated with an emulsifying agent, which is in turn coated with cocoa powder. These products of the invention are of the instant type, i.e., they dissolve and disperse rapidly in cold water or milk with only a slight amount of stirring.

The so-called instant forms of cocoa have been available commercially for some time. These products are mixtures of sucrose and cocoa, with optional ingredients in the form of surface active agents, salt, vanillin and other flavor and stability imparting materials. The purpose of these products is to provide a readily mixable form of cocoa which will blend rapidly with water, milk or other beverage upon slight mixing, as with a spoon, by the consumer. Hot beverages do not present the difficulty in dissolving and dispersing the cocoa products that cold beverages do. While a number of products have found their way to the market, they have not to date provided a satisfactory solution to the problem. Most of these products do not mix rapidly with beverages, particularly cold water or milk, and instead merely "ball up" or float on the surface of the liquid. Violent agitation or mechanically breaking up the floating cocoa is necessary to blend the solids with the liquid. This requires time and effort, and is inconvenient for the consumer. This and other disadvantages, such as loss of wettability of the dry product during storage and the powdery nature of the prior products, which make them dusty and tend to stick to the containers, etc., have caused the consumer acceptance of instant cocoa products to lag.

It is an object of the present invention to provide a novel and superior cocoa product of the instant variety which provides substantial and significant advantages over the prior art cocoa products.

It is another object of the present invention to provide novel cocoa products of cocoa and sugar, which optionally, but desirably, contain within the same sugar crystals at least one mono- or other di-saccharide.

It is also an object of the present invention to provide novel instant cocoa products, which blend rapidly with and sink rapidly in cold beverages, which are of a granular or crystalline nature rather than powdery, which do not lose their wettability with water during storage, are non-caking and free-flowing, and of substantially uniform grain size.

It is a further object of the present invention to provide an inexpensive and efficient substantially continuous process for producing the instant cocoa products of the invention.

Additional objects will be apparent to those skilled in the art from reading this description.

The novel instant cocoa product employs as an essential component a crystalline sugar product as disclosed in the copending patent application of D. V. Wadsworth, N. Rosenberg and S. P. Marino, Serial No. 823,849, filed June 30, 1959. These desired crystalline sugar products comprise fragile, fine-grain aggregates of rough, jagged porous crystals, which are substantially non-hydroscopic and non-caking, and which may optionally, but desirably, contain, in addition to sucrose, a mono- or other di-saccharide in an amount up to about 25% by weight of the total saccharide content. These crystalline sugar products may desirably be produced as part of a continuous process for producing the novel cocoa products of the invention and the process of producing the novel cocoa products of the invention will be described in one embodiment in the form of this continuous process.

Essentially, the process of producing the novel instant cocoa products of the invention comprises coating the crystalline sugar products described with from about 1 to 5% by weight of a non-ionic emulsifying agent by mixing the sugar product and emulsifier together while heating at a temperature above the melting point of the emulsifying agent and less than the decomposition point of the sugar product or emulsifying agent, and then coating the resulting product with sufficient cocoa to comprise from about 10 to 30%, and preferably 15 to 25%, by weight of the final product. Thus the instant cocoa comprises a crystalline sugar product coated with an emulsifying agent, which is in turn coated with cocoa. It is this particular combination and sequence of coating or mixing which provides the novel cocoa products or complexes of the invention, having their unique properties.

A preferred continuous process for producing the instant cocoa product of the invention comprises continuously and rapidly evaporating an aqueous sugar solution, which may desirably contain at least one other sugar, preferably invert or dextrose, and which has a Brix value of above 50°, although desirably less than about 75° and preferably between about 67° and 70°, whereby through continuous and rapid evaporation of water the Brix value is increased continuously and rapidly up to at least about 90° and desirably to between about 92° and 97°. The evaporation is continued rapidly to produce a supersaturated solution of the sugar or sugars on cooling. For successful results and uniformity of product, it is desirable to maintain the temperature at which the rapid evaporation takes place relatively constant, varying not more than about ±2° F. This evaporation is desirably carried out at a temperature of between about 260° and 300° F. (preferably 265 to 290° F.), with the temperature selected varying in relation to the nature of the sugar composition of the initial sugar solution employed. The resulting concentrated saturated sugar solution is then passed immediately from the rapid evaporator into a jacketed temperature-controlled mixer-crystallizer where the concentrated saturated solution is subjected to mixing and the temperature permitted to decrease until it has been reduced to a range of between about 180° and 230° F. During this mixing and cooling, and within a short period of time, the viscous, concentrated supersaturated sugar solution which results spontaneously crystallizes, and due to the latent heat given up during crystallization, substantially all of the residual water is evaporated and escapes from the mixer. Promptly upon the formation of hot crystals, from about 1 to 5% by weight of a non-ionic emulsifying agent heated to a temperature slightly above its melting point is added, during mixing, to the hot sugar crystals. With the removal of the last amounts of water, the crystals of sugar product which have become coated with emulsifying agent are discharged as hot crystals into a mixer-cooler. As the hot emulsifier-coated sugar crystals enter the mixer-cooler, sufficient cocoa powder is added to comprise from about 10 to 30% by weight of the resulting product. Optionally, small amounts of salt, vanillin, vitamin D, iron salts, and flavoring and coloring components may be added at this point. The cocoa emulsifier-coated sugar crystals are subjected to continuous mixing, conveying and cooling, being discharged from the vessel at a temperature below 100° F., with the moisture less than 2%. This product is then ready for use except for optional screening and packaging.

While the process of the invention has been described in its preferred continuous form, the production of the crystalline sugar product may first be completed and the sugar crystals subsequently coated with molten emulsifying agent followed by cocoa powder and other optional additives.

As will be apparent from the foregoing description of the process, the resulting instant cocoa product of the invention comprises a crystalline sugar product, coated with a small amount of an emulsifying agent, preferably a monoglyceride, which is in turn coated with cocoa powder. While it is not intended to be bound by any theory or mechanism of the present invention, it is believed that the emulsifying agent exerts, through a chemical and/or physical action, a bonding of the cocoa powder to the crystalline sugar product. Presumably the lyophilic portion of the emulsifying agent possesses an affinity for the cocoa powder, while the hydrophilic portion exerts an affinity for the crystalline sugar portion of the resulting complex structure. As a result of this structure, the cocoa powder surface of the resulting product becomes readily wettable by water and milk, even when cold. The affinity between the three layers of the resulting structure is great and cannot be overcome by even vigorous mechanical agitation. This is evidenced by the fact that the product of the invention does not lose its rapid wetting in cold liquids as a result of long storage or shaking before mixing with a liquid. The structure of the cocoa product of the invention is believed to be unique and to be responsible for the excellent properties of the product.

The crystalline sugar product employed in producing the cocoa product of the invention may be prepared by converting aqueous solutions of various concentrations of sucrose to crystals. The sugar content of these solutions may be substantially entirely sucrose or desirably the solution may contain additional mono- and di-saccharides such as dextrose, invert sugar, fructose, etc., or mixtures thereof. Desirably, the additional saccharides shall constitute less than about 25% and preferably less than 15%, by weight of the sugar solids in the solution.

One of the additional saccharides which may be advantageously present is either invert sugar or dextrose. This material, which is desirably present in an amount of less than 25% and preferably between about 4 and 12% or between about 6 and 10%, of the total sugar solid content, provides final cocoa products which possess significant advantages. The crystalline sugar product contains the invert or dextrose intimately and uniformly co-crystallized in each crystal along with sucrose. This phenomenon is unique with the sugar crystals employed in the present invention.

One most preferred continuous embodiment of the process of the present invention will now be described employing specific forms of evaporators and mixers which are readily available commercially and which have been found to provide eminently satisfactory results. The evaporator employed in the first step of the process to continuously produce the condensed saturated viscous sugar solution is desirably one of the high-efficiency, rapid evaporators currently available, providing such apparatus permits close control of temperature. One efficient centrifugal evaporating equipment is the turba-film evaporator sold under the trademark Rodney Hunt. This evaporator consists essentially of a jacketed vertical cylinder having vertically mounted high-speed rotor blades having relatively close tolerances with the inner vertical walls of the cylinder. These rotor blades rotate at high peripheral speed thereby forcing the liquid to be dried against the inner surface of the cylinder by centrifugal force. As the rotor blades rotate around the inner vertical surface, they force the liquid to be evaporated against the inner cylinder surface by centrifugal force and simultaneously form vertical descending fillets of liquid on the leading edge of each rotor blade. These fillets rotate with the blade movement imparting compressive rotational and centrifugal forces against the film of liquid on the inner surface, causing turbulence. The rotation of the blades provides a thin layer of liquid on the inner surface of the cylinder thereby providing greater surface area and more rapid evaporation. The jacket around the inner surface of the cylinder is heated by means of steam in controlled amounts. The liquid sugar descends as a component of the fillets traveling the entire length of the evaporator in a very short and precisely controlled period of time. The continuously heated, concentrated saturated sugar solution, which has had its Brix value increased to about 90°–97° in a very short period of time due to the high degree of efficiency of this apparatus, then continuously passes from the apparatus into the next stage of the process. The Rodney Hunt apparatus referred to hereinabove and employed in the specific examples hereinbelow is described in U.S. Patent No. 2,598,086 of Hans K. Muller which issued May 6, 1952. It is intended to incorporate by reference the disclosure and drawings of this patent in its entirety.

Continuous temperature control of the concentrated saturated sugar-containing liquid leaving the evaporator is important. Not only is it important to determine a suitable temperature for the particular sugar composition being processed and dried, but it is important to maintain that temperature within limits of ±2° F. The temperature range for each sugar composition will vary somewhat. Thus, while a temperature range of 267° F.±2° F. is suitable for a solution in which substantially the only sugar is sucrose, when the sugar solids consist of 8% invert in addition to sucrose, a temperature of 287°±2° F. is suitable. When the sugar composition consists of sucrose with varying amounts of invert, the preferred or mean temperature may be calculated by the following formula:

$$T_x = 267° F. + 2.5a$$

where $T_x$ = the mean temperature required
$a$ = percent invert of total sugar solids When other saccharides, such as dextrose, lactose, and fructose are also present with the sucrose, other temperatures such as those in accordance with the specific examples hereinbelow are suitable.

The mixer-crystallizer into which the concentrated saturated sugar solution continuously enters after treatment in the evaporator, may be any mixing device which provides beating of the concentrated sugar solution with adequate temperature control. One such mixer-crystallizer comprises substantially a cylinder having therein a rotating shaft parallel with the longitudinal axis of the cylinder, to which blades are attached to provide trituration and agitation of the sugar as well as to advance the travel of the sugar through the apparatus. The shaft holding the agitating blades may be rotated at any speed, but desirably at about 30–40 r.p.m., depending upon the particular equipment employed, during the mixing and crystallization of the sugar. The concentrated supersaturated sugar solution increases in viscosity and, because of its state of super-saturation and the slight decrease in temperature from that of the evaporator, spontaneous crystallization occurs. During the very short period of time during which the viscous sugar solution is converted into the crystalline state, there is intimate mixing and trituration. Substantially all of the residual water vaporizes, leaving behind the finely-divided crystalline sugar product. Due to the almost instantaneous loss of water, there is no significant subsequent crystal growth and the crystals produced are substantially in the same form in which they are initially formed. The resulting crystals are finely-divided, random and uneven.

At the station where the hot crystals of sugar product are freshly formed, molten non-ionic emulsifying agent is introduced continuously, with continued mixing of the sugar crystals, in an amount of between about 1 and 5% by weight of the sugar. This treatment coats the sugar crystals with emulsifying agent.

The resulting hot emulsifier-coated crystals leave the crystallizer, charging into a mixer-cooler. As the hot emulsifier-coated crystals enter the mixer-cooler, sufficient cocoa powder is continuously added to comprise from about 10 to 30%, and preferably 15 to 25%, by weight of the resulting mixture, preferably while the coated crystals still have a temperature of between about 180 and 230° F. The cocoa powder becomes coated on the hot emulsifier-coated sugar crystals. Optionally, other flavoring, coloring and nutritional ingredients may be added at this time. It is important that the crystals be constantly agitated and dispersed during the addition of the cocoa and other optional ingredients in order to insure complete coating of all sugar crystals. The mixer-cooler is provided with a jacket through which cooling water is passed in order to cool the cocoa-sugar mixture as it is being mixed and conveyed through the vessel. Optionally, refrigerated air may also be used to aid in cooling the mixture by passing it over the granular product as it is being agitated and conveyed through the vessel. The dry granular product discharging from the vessel has a temperature less than about 100° F., a moisture content less than about 2% and is ready for packaging.

The dry crystalline sugar employed in the instant cocoa of the invention is unique in character. The product comprises fragile, fine grain aggregates or clusters of rough, jagged, porous crystals. The crystals are more easily crushed than granulated sugar and can be reduced to an even more finely-divided state, if desired. However, because of the fineness and porosity of the grain, the crystals usually do not require grinding. The sugar crystals are characterized by the rapid rate at which they dissolve in water. The crystals are further characterized by having greater bulk than even extra-fine granulated sucrose. Thus, while extra fine granulated sucrose has a density of 53 pounds per cubic foot, the densest sugar crystals in accordance with the present invention have a density of 46 pounds per cubic foot at most. When compared to ordinary granulated sugar, some of the present sugar crystals have about one-half the density (twice the bulkiness).

Where more than one sugar is present, the sugar crystals employed in the present invention are characterized by substantially uniform distribution of each sugar throughout each crystal. This is a distinguishing feature of these sugar crystals. Another important feature of these sugar crystals is that they are substantially non-hygroscopic. This is particularly unique for crystals containing invert. As those skilled in the art recognize, invert sugar is notorious for its propensity to absorb moisture from the atmosphere. This difficulty has prevented the use of dry solid products containing invert. Accordingly, the present invention permits one to market invert-containing instant cocoa products in dry solid form under circumstances which normally would be unfavorable.

Among the other saccharides which may be employed with sucrose are: invert, dextrose, etc. and mixtures of these.

As has been pointed out hereinabove, the use of the particular crystalline sugar products described is important to provide optimum properties for the instant cocoa products of the invention.

The emulsifying agent is desirably employed in an amount of from about 1 to 5% by weight of the crystalline sugar product. Generally, 2% by weight is very satisfactory. For optimum results, the amount of emulsifying agent is selected with the range of from about 1 to 5% by weight of the sugar based upon the amount of cocoa powder used and its fat content in accordance with the following equation:

$$E = F \times C$$

where $E$ = percent of emulsifying agent by weight of crystalline sugar product
$F$ = factor for various fat contents of cocoa powder, thus:

| F-value: | Fat-content of cocoa powder, percent |
|---|---|
| 0.05 | 0 to 5 |
| 0.10 | 6 to 18 |
| 0.2 | 19 to 25 |

$C$ = percent of cocoa powder in the final product.

The emulsifying agent employed is desirably a nonionic agent, preferably an ester of an unsaturated fatty acid and a polyhydroxy compound or alcohol in which the ester has at least two free hydroxyl groups, the fatty acid moiety having from about 8 to 20 carbon atoms. When fatty acid contains from about 16 to 20 carbon atoms, it must have an iodine value of about 40 or above. When the fatty acid contains from about 8 to 14 carbon atoms, it may be either saturated or unsaturated. The hydrophil-lyophil balance ratio is desirably below about 10. Preferably the average molecular weight of the emulsifying agent is between about 200 and 650. The polyhydric compounds from which the esters are formed include the hexahydric alcohols, sorbitol and mannitol, a trihydric alcohol such as glycerol and other polyhydric alcohols containing at least 3 carbon atoms, including methyl glucoside. The fatty acid portion of the esters include oleic, linoleic acids and corn oil, soy bean, cotton seed, and coconut oil fatty acids, and fatty acids from edible animal fats.

The preferred emulsifying agents are the monoglycerides of unsaturated fatty acids. These include the distilled monoglycerides sold under the trade name Myverol. Listed below are several of the Myverols which are satisfactory and their source.

| Myverol No.: | Monoglyceride distilled from— |
|---|---|
| 1840 | Prime lard. |
| 1871 | Oleic acid. |
| 1885 | Refined cotton seed oil. |
| 1890 | Soy bean oil. |

(NOTE.—The Myverol number designates the average number of carbon atoms in fatty acid moiety of the monoglyceride by the first two digits and the iodine value of the fatty acid moiety in the second two digits.)

Other satisfactory emulsifying agents include:

Methyl glucoside monococonate
Methyl glucoside dicoconate
Methyl glucoside monooleate
Sorbitan monooleate (Coconate designates the fatty acids obtained upon hydrolyzing coconut oil.)

The emulsifying agents of the invention may include up to about 50% by weight of lecithin and up to about 10% by weight of diglycerides. Lecithin by itself is not satisfactory, nor are the diglycerides.

The cocoa powder employed to coat over the emulsifying agent coating on the crystalline sugar product may comprise between about 10 and 30% by weight of the resulting instant cocoa product of the invention. From about 15 to 25% is preferred. Any type of commercial cocoa powder may be employed, having any fat content, even as high as 25% fat, as well as totally defatted cocoa powder. It is unique that high fat content cocoa powder may be employed without limiting the rapid blending character of the instant cocoa product when mixed by hand stirring with cold milk or water. It has been necessary to limit the fat content of the cocoa products of the prior art to provide even a minimum of blending properties.

The instant cocoa products of the invention are characterized by their rapid dispersion in cold beverages with only ordinary hand stirring by the consumer, excellent smoothness, uniformity, palatability, and freedom from lumps and floating particles of the resulting dispersion. The dry products have excellent bulk properties as indicated by their low densities.

In order to more clearly disclose the nature of the present invention, the following examples are given for the purposes of illustration, employing the apparatus described hereinabove. It should be understood, however, that this is done solely by way of example and is intended neither to delineate the scope of the invention nor limit the ambit of the appended claims.

EXAMPLE 1

This example describes the preparation of an instant dry crystalline cocoa product in accordance with the invention in which the crystalline sugar component contains about 92% sucrose and 8% invert sugar, the emulsifying agent is a monoglyceride distilled from refined cotton seed oil and the cocoa powder is Dutch process cocoa having a fat content of about 8 to 10%.

An aqueous sugar solution, having a color of 0.3 on the Horne scale, of 68.8° Brix, in which the sugar solids content was about 8.09% invert and 91.91% sucrose, was introduced continuously into a high speed centrifugal film evaporator of the turba-film type (Rodney Hunt), described hereinabove, in which the temperature control was set at 287° F. to maintain continuously the temperature of the condensed sugar solution as it leaves the evaporator at between 285 and 289° F. at all times. The continuous flow of the sugar solution through the centrifugal evaporator was maintained at a rate of 6 pounds of sugar solids per minute. At the time of continuously discharging the sugar solution from the centrifugal evaporator, most of the water had been removed and it had a Brix of 95–97°. The temperature control of between 285–289° F. was of great importance since at a temperature of below 285° F., the sugar component obtained at the end of the process was quite wet, lumpy and hard grained, whereas at a temperature of above 289° F., the sugar component was hard grained, lumpy and off color. The concentrated sugar solution discharged continuously from the centrifugal evaporator was next passed into a mixer-crystallizer. There was added continuously with mixing to the freshly-formed hot sugar crystals in the mixer-crystallizer, molten Myverol 1885 (a monoglyceride distilled from refined cotton seed oil), maintained at a temperature of between 120 and 140° F., in an amount of about 2% by weight of the total sugar solids. In the course of the mixing the sugar crystals became coated with the monoglycerides. The substantially dry monoglyceride coated sugar product which emerged from the mixer-crystallizer was then passed continuously through a cooling mixer. As the hot Myverol-coated sugar entered the mixer-cooler, dry cocoa powder (Dutch process cocoa containing 8–10% fat) was added, continuously, with mixing, in an amount comprising about 20% by weight of the product along with 0.5% salt and 0.1% vanillin. The granular cocoa-sugar mixture was cooled by circulating cooling water through the jacket of the vessel. When the dry sugar product was discharged from the cooling mixer it had a temperature of less than 100° F. The resulting dry instant cocoa product had the following composition:

| Component: | Percent by weight of solids of finished product |
|---|---|
| Crystalline sucrose-invert | 78.2 |
| Cocoa powder | 19.6 |
| Myverol 1885 | 1.6 |
| Salt | 0.5 |
| Vanillin | 0.1 |

The moisture content of the product was 1–2%.

The instant cocoa product of this example had a bulk density of 35–39 pounds per cubic foot. The mean particle size was approximately No. 50 U.S. Standard Sieve aperture size and the particles were substantially uniform in size. The product was granular in nature and had a rich-shining golden brown color. 10% by weight of the product, when blended by hand stirring, dispersed rapidly in cold milk to provide a sweet chocolate milk drink with a rich reddish color and delicious cocoa taste. Using a 150 ml. beaker, when a 10 gram sample of the product was placed on the top of 100 ml. of homogenized milk, having a temperature of 45–50° F., without any agitation, the instant cocoa product sank below the surface of the milk in 7.5 seconds, showing the high degree of wettability of the product.

The crystalline sugar component of this product is made up of very small crystals, which are irregular, sharp-edged, and they occur mostly in clusters, but also singly and in groups. The crystals are fragile and easily crushed.

Instant cocoa products of the invention may be prepared employing sucrose-invert crystals as the sugar component, containing other proportions of invert solids in the total sugar solids. The temperature range of evaporation for each of these sugars is important for below the lower limit the sugar is wet, lumpy and hard grained and above the upper limit the sugar is powdery, lumpy and hard grained.

The temperature range of the sugar and invert solution discharging from the centrifugal evaporator is directly related to the percent invert present, and is shown in Table I below:

Table I

| Sugars | Mean Temperature, °F. | Temperature Range, °F. |
|---|---|---|
| Sucrose 100%, Invert 0% | 267 | 265–269 |
| Sucrose 98%, Invert 2% | 272 | 270–274 |
| Sucrose 96%, Invert 4% | 277 | 275–279 |
| Sucrose 94%, Invert 6% | 282 | 280–284 |
| Sucrose 92%, Invert 8% | 287 | 285–289 |

For each increment increase of 2% invert solids of the total sugar solids, a corresponding increase of 5° F. in the mean temperature and temperature range is required.

EXAMPLE 2

Example 1 was repeated except that the amount of Myverol 1885 was 1.5% by weight of the total sugar solids (instead of 2%) and the amount of cocoa powder employed was approximately 15% by weight of the final product (instead of 20%). The resulting dry instant cocoa product had the following composition.

| Component: | Percent by weight of solids of finished product |
|---|---|
| Crystalline sucrose-invert | 83.5 |
| Cocoa powder | 14.6 |
| Myverol 1885 | 1.3 |
| Salt | 0.5 |
| Vanillin | 0.1 |
| | 100.0 |

The moisture content of the product was 1–2%.

The instant cocoa product of this example had a bulk density of 36–41 pounds per cubic foot. The mean particle size was approximately No. 50 U.S. Standard Sieve aperture size and the particles were substantially uniform in size. The product was granular in nature and had a rich golden brown color. 10% by weight of the product, when blended by hand stirring, dispersed rapidly in cold milk to provide a sweet chocolate milk drink with a rich reddish color and delicious sweet cocoa taste. Using a 150 ml. beaker, when a 10 gram sample of the product was placed on the top of 100 ml. of homogenized milk having a temperature of 45–50° F., without any agitation, the instant cocoa product sank below the surface of the milk in 6.7 seconds, showing the high degree of wettability of the product.

EXAMPLE 3

Example 1 was repeated except that the amount of Myverol 1885 was 1.0% by weight of the total sugar solids (instead of 2%) and the cocoa powder employed was defatted (solvent extracted). The resulting dry instant cocoa product had the following composition.

| Component: | Percent by weight of solids of finished product |
|---|---|
| Crystalline sucrose-invert | 78.9 |
| Cocoa powder (defatted) | 19.7 |
| Myverol 1885 | 0.8 |
| Salt | 0.5 |
| Vanillin | 0.1 |
| | 100.0 |

The moisture content of the product was 1–2%.

The instant cocoa product of this example had a bulk density of 38–42 pounds per cubic foot. The mean particle size was approximately No. 60 U.S. Standard Sieve aperture size and the particles were substantially uniform in size. The product was granular in nature and had a rich yellow-brown color. 10% by weight of the product, when blended by hand stirring, dispersed rapidly in cold milk to provide a sweet chocolate milk drink with an excellent color and delicious sweet cocoa taste. Using a 150 ml. beaker, when a 10 gram sample of the product was placed on the top of 100 ml. of homogenized milk, having a temperature of 45–50° F., without any agitation, the instant cocoa product sank below the surface of the milk in 23.8 seconds, showing a high degree of wettability of the product.

The product of the foregoing example was also produced by first producing the sugar product and coating it with Myverol and then cocoa powder. The resulting product had similar properties.

EXAMPLE 4

Example 1 was repeated except that the amount of Myverol 1885 was 4% by weight of the total sugar solids (instead of 2%) and the cocoa powder employed contained a high fat content (22–24%). The resulting dry instant cocoa product had the following composition.

| Component: | Percent by weight of solids of finished product |
|---|---|
| Crystalline sucrose-invert | 77.0 |
| Cocoa powder (22–24% fat) | 19.3 |
| Myverol 1885 | 3.1 |
| Salt | 0.5 |
| Vanillin | 0.1 |
| | 100.0 |

The moisture content of the product was 1–2%.

The instant cocoa product of this example had a bulk density of 36–41 pounds per cubic foot. The mean particle size was approximately No. 60 U.S. Standard Sieve aperture size and the particles were substantially uniform in particle size. The product was granular in nature and had a dark brown color. 10% by weight of the product, when blended by hand stirring, dispersed rapidly in cold milk to provide a sweet chocolate milk drink with a deep reddish color and delicious sweet cocoa taste. Using a 150 ml. beaker, when a 10 gram sample of the product was placed on the top of 100 ml. of homogenized milk, having a temperature of 45–50° F., without any agitation, the instant cocoa product sank below the surface of the milk in 23.7 seconds, showing a particularly high degree of wettability of the product considering the high concentration of fat in the cocoa powder.

The product of the foregoing example was also produced by first producing the sugar product and coating it with Myverol and then cocoa powder. The resulting product had similar properties.

EXAMPLE 5

This example describes the preparation of an instant dry crystalline cocoa product in accordance with the invention in which the crystalline sugar component contains about 92% sucrose and 8% dextrose, the emulsifying agent is a monoglyceride distilled from refined cotton seed oil and is employed in an amount of about 1.6% of the final product, and the cocoa powder is Dutch process cocoa having a fat content of about 8 to 10%.

The procedure of Example 1 was repeated employing as the aqueous sugar solution one having a color of 0.3 on the Horne scale, of 67.5° Brix, in which the sugar solids content was about 8.06% dextrose and 91.94% sucrose. The resulting dry instant cocoa product had the following composition.

| Component: | Percent by weight of solids of finished product |
|---|---|
| Crystalline sucrose-dextrose | 78.2 |
| Cocoa powder | 19.6 |
| Myverol 1885 | 1.6 |
| Salt | 0.5 |
| Vanillin | 0.1 |
| | 100.0 |

The moisture content of the product was 1–2%.

The instant cocoa product of this example had a bulk density of 37–41 pounds per cubic foot. The mean particle size was approximately No. 50 U.S. Standard Sieve aperture size and the particles were substantially uniform in size. Using a 150 ml. beaker, when a 10 gram sample of the product was placed on the top of 100 ml. of homogenized milk, having a temperature of 45–55° F., without any agitation, the instant cocoa product sank below the surface of the milk in 8.4 seconds, showing the high degree of wettability of the product.

EXAMPLE 6

This example describes the preparation of an instant dry crystalline cocoa product in accordance with the invention in which the crystalline sugar component is substantially all sucrose, the emulsifying agent is a monoglyceride distilled from refined cotton seed oil and the cocoa powder is Dutch process cocoa having a fat content of about 8 to 10%.

The procedure of Example 1 was repeated employing as the sugar solution an aqueous water-white solution, of 67.4° Brix, in which the sugar solids content was substantially sucrose, the Myverol 1885 was employed in an amount of about 1.5 percent by weight of sugar solids, and about 15% by weight of cocoa powder was employed instead of 20%. The resulting dry instant cocoa product had the following composition.

| Component: | Percent by weight of solids of finished product |
|---|---|
| Crystalline sucrose | 83.5 |
| Cocoa powder | 14.6 |
| Myverol 1885 | 1.3 |
| Salt | 0.5 |
| Vanillin | 0.1 |
| | 100.0 |

The moisture content of the product was 1–2%.

The instant cocoa product of this example had a bulk density of 41–49 pounds per cubic foot. The mean particle size was approximately No. 50 U.S. Standard Sieve aperture size. The product was granular in nature and had a rich golden brown color. 10% by weight of the product, when blended by hand stirring, dispersed rapidly in cold milk to provide a sweet chocolate milk drink with a rich reddish color and delicious sweet cocoa taste. Using a 150 ml. beaker, when a 10 gram sample of the product was placed on the top of 100 ml. of homogenized milk, having a temperature of 45–50° F., without any agitation, the instant cocoa product sank below the surface of the milk in 35.1 seconds.

As will be apparent to those skilled in the art, other of the rough jagged crystalline sugar products described in conjunction with the continuous process may be employed in any of the foregoing examples. Thus, sucrose-dextrose products or products of sucrose containing intimately mixed within the crystals other saccharides, such as lactose, dextrose, etc., may be employed. Other non-ionic emulsifying agents of the type described may also be employed in any of the foregoing examples. Thus, unsaturated monoglycerides having a fatty acid moiety with an iodine value of at least 40 may be employed as well as mixtures thereof and the emulsifying agent may contain up to 50% by weight of lecithin. Cocoa powders of any type may be employed having a fat content of from 0 up to about 25%.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. A dry crystalline cocoa product which is substantially non-hygroscopic, non-caking and capable of being rapidly blended with cold beverages, comprising crystals of a sugar coated with from between about 1 and 5% by weight of a non-ionic emulsifying agent based on weight of sugar which emulsifying agent is coated with sufficient cocoa powder to comprise from about 10 to 30% by weight of the product; said non-ionic emulsifying agent is an ester of fatty acid and a polyhydroxy alcohol in which the polyhydroxy alcohol moiety of the ester has at least two free hydroxyl groups and the fatty acid moiety contains from about 8 to 20 carbon atoms and when the fatty acid moiety of said ester contains at least about 16 carbon atoms, said ester shall have an iodine value of at least about 40.

2. A dry crystalline cocoa product as defined by claim 1 wherein the composition of the sugar component is comprised of sucrose and invert.

3. A dry crystalline cocoa product as defined by claim 1 wherein the composition of the sugar component is primarily sucrose and also comprising up to about 25% by weight of at least one additional saccharide.

4. A dry crystalline cocoa product as defined by claim 1 wherein the composition of the sugar is primarily sucrose and also comprising up to about 12% by weight of invert sugar.

5. A dry crystalline cocoa product as defined by claim 1 wherein the composition of the sugar is primarily sucrose and also comprises about 8% by weight of invert.

6. A dry crystalline cocoa product as defined by claim 1 wherein the non-ionic emulsifying agent is a monoglyceride of a fatty acid containing from about 8 to 20 carbon atoms and when containing at least 16 carbon atoms shall have an iodine value of at least about 40.

7. A process for producing a crystalline cocoa product which comprises mixing crystals of a sugar with between about 1 and 5% by weight of a molten non-ionic emulsifying agent followed by mixing the resulting coated sugar with sufficient cocoa powder to comprise from about 10 to 30% of the resulting mixture thereby forming a coating of cocoa powder upon the sugar coated with emulsifying agent; said non-ionic emulsifying agent is an ester of fatty acid and a polyhydroxy alcohol in which the polyhydroxy alcohol moiety of the ester has at least two free hydroxyl groups and the fatty acid moiety contains from about 8 to 20 carbon atoms and when the fatty acid moiety of said ester contains at least about 16 carbon atoms, said ester shall have an iodine value of at least about 40.

8. A process as defined by claim 7 wherein the sugar crystals are primarily of sucrose and also comprise up to about 25% by weight of at least one additional saccharide.

9. A process as defined by claim 7 wherein the sugar crystals are primarily of sucrose and also comprise up to about 12% by weight of invert sugar.

10. A process as defined by claim 7 wherein the non-ionic emulsifying agent is a monoglyceride of a fatty acid containing from about 8 to 20 carbon atoms and when having at least 16 carbon atoms shall have an iodine value of at least about 40.

11. A process for producing a crystalline cocoa product which comprises rapidly evaporating an aqueous sugar solution having a Brix of above about 50° until the Brix value is increased rapidly to at least about 90°, mixing the resulting superaturated aqueous solution while the product crystallizes, adding with mixing from about 1 to 5% by weight of non-ionic emulsifying agent to the freshly formed hot sugar crystals, continuing the mixing of the resulting coated crystalline sugar product and adding with mixing sufficient cocoa powder to comprise between about 10 and 30% by weight of the resulting mixture, and continuing the mixing until the temperature is reduced to below about 100° F.; said non-ionic emulsifying agent is an ester of fatty acid and a polyhydroxy alcohol in which the polyhydroxy alcohol moiety of the ester has at least two free hydroxyl groups and the fatty acid moiety contains from about 8 to 20 carbon atoms and when the fatty acid moiety of said ester contains at least about 16 carbon atoms, said ester shall have an iodine value of at least about 40.

12. A process for producing a crystalline cocoa product which comprises rapidly evaporating an aqueous sugar solution having a Brix of between about 50° and 75°, until the Brix value is increased rapidly to between about 90° and 97°, mixing the resulting supersaturated aqueous solution while reducing the temperature to between about 180 and 230° F. and while the product crystallizes, adding with mixing from about 1 to 5% by weight of non-ionic emulsifying agent to the freshly formed hot sugar crystals, continuing the mixing of the resulting coated crystalline sugar product and adding with mixing sufficient cocoa powder to comprise between about 10 and 30% by weight of the resulting mixture, and continuing the mixing until the temperature is reduced to below about 100° F.; said non-ionic emulsifying agent is an ester of fatty acid and a polyhydroxy alcohol in which the polyhydroxy alcohol moiety of the ester has at least two free hydroxyl groups and the fatty acid moiety contains from about 8 to 20 carbon atoms and when the fatty acid moiety of said ester contains at least about 16 carbon atoms, said ester shall have an iodine value of at least about 40.

13. A process for producing a crystalline cocoa product which comprises rapidly evaporating an aqueous sugar solution of sucrose containing at least one other saccharide comprising not more than 10% by weight of the sugar solids, having a Brix of between about 50° and 75°, until the Brix value is increased rapidly to between about 90° and 97°, mixing the resulting supersaturated aqueous solution while reducing the temperature to between about 180 and 230° F. and while the product crystallizes, adding with mixing from about 1 to 5% by weight of non-ionic emulsifying agent to the freshly formed hot sugar crystals, continuing the mixing of the resulting coated crystalline sugar product and adding with mixing sufficient cocoa powder to comprise between about 10 and 30% by weight of the resulting mixture, and continuing the mixing until the temperature is reduced to below about 100° F.; said non-ionic emulsifying agent is an ester of fatty acid and a polyhydroxy alcohol in which the polyhydroxy alcohol moiety of the ester has at least two free hydroxyl groups and the fatty acid moiety contains from about 8 to 20 carbon atoms and when the fatty acid moiety of said ester contains at least about 16 carbon atoms, said ester shall have an iodine value of at least about 40.

14. A process as defined in claim 8 wherein the other saccharide is invert and is present in an amount of up to about 12% by weight of sucrose solids.

References Cited in the file of this patent

UNITED STATES PATENTS

| | | |
|---|---|---|
| 2,117,344 | Middleton | May 17, 1938 |
| 2,336,254 | Jones et al. | Dec. 7, 1943 |
| 2,399,195 | Bodenheim | Apr. 30, 1946 |
| 2,452,770 | Lang | Nov. 2, 1948 |
| 2,539,518 | Mayberry | Jan. 30, 1951 |
| 3,006,763 | Marcy et al. | Oct. 31, 1961 |